(12) United States Patent
Hayashi et al.

(10) Patent No.: US 12,354,525 B2
(45) Date of Patent: Jul. 8, 2025

(54) DISPLAY APPARATUS AND DISPLAY SYSTEM

(71) Applicant: Sharp Display Technology Corporation, Kameyama (JP)

(72) Inventors: Tatsuya Hayashi, Kameyama (JP); Kohji Saitoh, Kameyama (JP); Kazuhisa Yoshimoto, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/777,606

(22) Filed: Jul. 19, 2024

(65) Prior Publication Data

US 2025/0029541 A1 Jan. 23, 2025

(30) Foreign Application Priority Data

Jul. 21, 2023 (JP) .................................. 2023-119441

(51) Int. Cl.
| | |
|---|---|
| *G09G 3/22* | (2006.01) |
| *G06F 1/3203* | (2019.01) |
| *G06F 1/3234* | (2019.01) |
| *G09G 3/20* | (2006.01) |
| *G09G 3/36* | (2006.01) |

(52) U.S. Cl.
CPC ......... *G09G 3/2096* (2013.01); *G06F 1/3203* (2013.01); *G06F 1/3262* (2013.01); *G06F 1/3265* (2013.01); *G09G 3/2092* (2013.01); *G09G 3/3696* (2013.01); *G09G 2310/08* (2013.01); *G09G 2330/021* (2013.01); *G09G 2330/022* (2013.01); *G09G 2330/023* (2013.01); *G09G 2370/00* (2013.01)

(58) Field of Classification Search
CPC ........ G06F 1/26; G06F 1/3265; G06F 1/3203; G06F 1/3206; G06F 1/3262; G09G 2330/021; G09G 2330/028; G09G 3/3696; G09G 3/20; G09G 3/2096; G09G 2330/022; G09G 2330/023; G09G 2310/08; H02M 1/0032; H02M 1/0003
See application file for complete search history.

(56) References Cited

U.S. PATENT DOCUMENTS

| | | | |
|---|---|---|---|
| 9,595,216 B2 * | 3/2017 | Park | G09G 3/20 |
| 10,156,892 B2 * | 12/2018 | Lim | G09G 3/3291 |
| 10,649,509 B2 * | 5/2020 | Lee | G06F 1/26 |
| 11,244,654 B2 | 2/2022 | Sinha et al. | |

(Continued)

FOREIGN PATENT DOCUMENTS

| | | |
|---|---|---|
| JP | 2002-268610 A | 9/2002 |
| JP | 2017-091224 A | 5/2017 |

*Primary Examiner* — Dismery Mercedes
(74) *Attorney, Agent, or Firm* — ScienBiziP, P.C.

(57) ABSTRACT

A display apparatus includes a timing control circuit and a power converter circuit. In response to reception of a control signal used to transition from a display mode to a pause mode from a host controller, the timing control circuit transmits a pause signal to the power control circuit. The power control circuit converts an input voltage to an output voltage at a first switching frequency in the display mode before receiving the pause signal and converts the input voltage to the output voltage at a second switching frequency in the pause mode after receiving the pause signal from the timing control circuit.

4 Claims, 7 Drawing Sheets

(56) References Cited

U.S. PATENT DOCUMENTS

| | | | |
|---|---|---|---|
| 2002/0111200 A1* | 8/2002 | Nikawa | H04W 52/027 |
| | | | 455/343.1 |
| 2002/0154080 A1 | 10/2002 | Miyazaki | |
| 2010/0162018 A1* | 6/2010 | Subramanian | G06F 1/3203 |
| | | | 713/340 |
| 2015/0106759 A1* | 4/2015 | Ryo | G06F 1/3218 |
| | | | 715/781 |
| 2016/0188142 A1* | 6/2016 | Oh | G06F 1/3265 |
| | | | 345/87 |
| 2017/0131829 A1 | 5/2017 | Takahashi et al. | |
| 2019/0094590 A1* | 3/2019 | Aoki | G09G 3/36 |
| 2021/0327350 A1* | 10/2021 | Nam | G09G 3/3233 |
| 2022/0415241 A1* | 12/2022 | Yoon | G06F 1/3296 |

\* cited by examiner

DISPLAY APPARATUS AND DISPLAY SYSTEM

BACKGROUND

1. Field

The present disclosure relates to a display apparatus and a display system.

2. Description of the Related Art

Japanese Unexamined Patent Application Publication No. 2002-268610 discloses a driving power supply circuit of liquid crystal used in a display apparatus. The driving power supply circuit includes capacitors and switches. The driving power supply circuit converts an input voltage into a voltage having a voltage value used to drive the liquid crystal, by causing a capacitor to store charges with the input voltage applied to the capacitor and switching a switch connected to the capacitor at a predetermined switching frequency.

The display apparatus disclosed in Japanese Unexamined Patent Application Publication No. 2017-91224 performs a control operation in a normal operation mode that displays an image on a display panel or in a sleep mode that does not display images on the display panel. The display apparatus is designed to transition to the sleep mode if no touching operation is performed in the normal operation mode for a predetermined period of time. The display apparatus is also designed to transition to the normal operation mode if the touching operation is performed in the sleep mode.

In the sleep mode (pause mode) described with reference to Japanese Unexamined Patent Application Publication No. 2017-91224, power consumption is not sufficiently reduced since at least part of the display apparatus is continuously powered.

It is desirable to provide a display apparatus and a display system that may reduce power consumption while an control operation is performed in a pause mode.

SUMMARY

According to a first aspect of the disclosure, there is provided a display apparatus including: a display panel; a display driving circuit that supplies the display panel with a driving signal; a timing control circuit that supplies the display panel with an image signal and the display driving circuit with a timing signal; and a power converter circuit that converts input power at an input voltage into power at an output voltage and supplies the power at the output voltage to at least one of the display panel, the display driving circuit and the timing control circuit, wherein in response to reception of a control signal from a host controller with the control signal used to transition the display panel from a display mode causing the display panel to perform displaying to a pause mode causing the display panel to stop displaying, the timing control circuit transmits a pause signal to the power converter circuit, and wherein the power converter circuit converts the input voltage to the output voltage at a first switching frequency in the display mode before receiving the pause signal and converts the input voltage to the output voltage at a second switching frequency lower than the first switching frequency in the pause mode after receiving the pause signal from the timing control circuit.

According to a second aspect of the disclosure, there is provided a display system including: a display apparatus including a display panel; and a host controller that transmits to the display apparatus a control signal that transitions the display panel from a display mode causing the display panel to perform displaying to a pause mode causing the display panel to stop displaying, wherein the display apparatus includes: a display driving circuit that supplies the display panel with a driving signal; a timing control circuit that supplies the display panel with an image signal and the display driving circuit with a timing signal; and a power converter circuit that converts input power at an input voltage into power at an output voltage and supplies the power at the output voltage to at least one of the display panel, the display driving circuit and the timing control circuit, wherein in response to reception of the control signal from the host controller with the control signal used to transition the display panel from the display mode causing the display panel to perform displaying to the pause mode causing the display panel to stop displaying, the timing control circuit transmits a pause signal to the power converter circuit, and wherein the power converter circuit converts the input voltage to the output voltage at a first switching frequency in the display mode before receiving the pause signal and converts the input voltage to the output voltage at a second switching frequency lower than the first switching frequency in the pause mode after receiving the pause signal from the timing control circuit.

DESCRIPTION OF THE EMBODIMENTS

Embodiments of the disclosure are described with reference to the drawings. The disclosure is not limited to the embodiments described below. The embodiments may be appropriately modified without departing from the scope of the disclosure. In the discussion that follows, like elements or elements having the same function are designated with the same reference numerals throughout different drawings and the discussion thereof are not repeated. Configurations in the embodiments and modifications of the embodiments may be combined or changed without departing from the scope of the disclosure. For easier understanding, the configurations may be simplified or clarified in the drawings, and some of components in each configuration may be omitted.

First Embodiment

Whole Configuration of Display Apparatus

Figure 1:
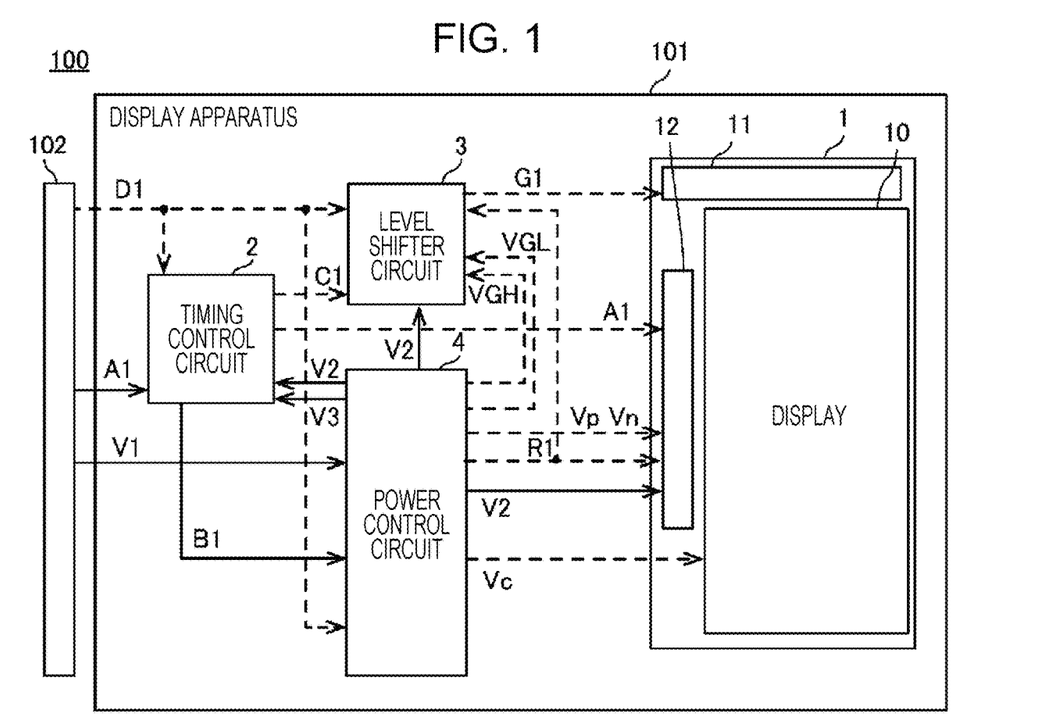
FIG. 1 is a block diagram of a display system of a first embodiment.

FIG. 1 is a block diagram of a display system 100 of a first embodiment. The display system 100 includes a display apparatus 101 and a host controller 102. The display system 100 may be a personal computer, a tablet terminal, a smart phone or a television device. The host controller 102 transmits to the display apparatus 101 not only an image signal (video signal) A1 but also a control signal D1. The host controller 102 is connected to the display apparatus 101 via an I2C bus and performs serial communication with the display apparatus 101. The display apparatus 101 displays an image in response to the image signal A1 from the host controller 102.

The control signal D1 includes a signal that commands a display panel 1 of the display apparatus 101 to transition from a display mode causing the display panel 1 to perform displaying to a pause mode causing the display panel 1 to stop displaying. For example, if no input is entered by a user for a specific period of time in the middle of a control operation in the display mode or the user is not present within a shooting range of a camera (not illustrated), the host controller 102 transmits the control signal D1 including the signal used to transition from the display mode to the pause mode. If an input is entered by the user in the middle of the control operation in the pause mode or the user appears within the shooting range of the camera, the host controller 102 transmits the control signal D1 including the signal used to transition from the pause mode to the display mode. According to the first embodiment, the host controller 102 supplies a power control circuit 4 with a voltage V1 regardless of whether the control operation is performed in the display mode or the pause mode.

The pause mode is a state in which the display panel 1 is caused to pause or stop displaying to reduce power consumption. The stopping of the displaying of the display panel 1 in the pause mode continues until the mode is transitioned to the display mode (the displaying is stopped across multiple frames). The stopping of the displaying signifies that the supply of signals (a gate signal and a gate driving signal) from a gate driving circuit 11 and a source driving circuit 12 to the display 10 is stopped in the display panel 1. The display mode is a state in which an image is displayed on the display panel 1 by supplying the signals (the gate signal and the gate driving signal) from the gate driving circuit 11 and the source driving circuit 12 to the display 10. Transmission of signals and supply of power denoted by arrow-headed broken lines in FIGS. 1, 4, 8 and 9 are performed only in the display mode. The transmission of signals and the supply of power denoted by arrow-headed solid lines in FIGS. 1, 4, 8 and 9 are performed in both the display mode and the pause mode.

Configuration of Display Apparatus

As illustrated in FIG. 1, the display apparatus 101 includes a display panel 1, a timing control circuit 2, a level shifter circuit 3 and a power control circuit 4. The level shifter circuit 3 is an example of a "display driving circuit" in the disclosure.

Configuration of Display Panel

Figure 2:
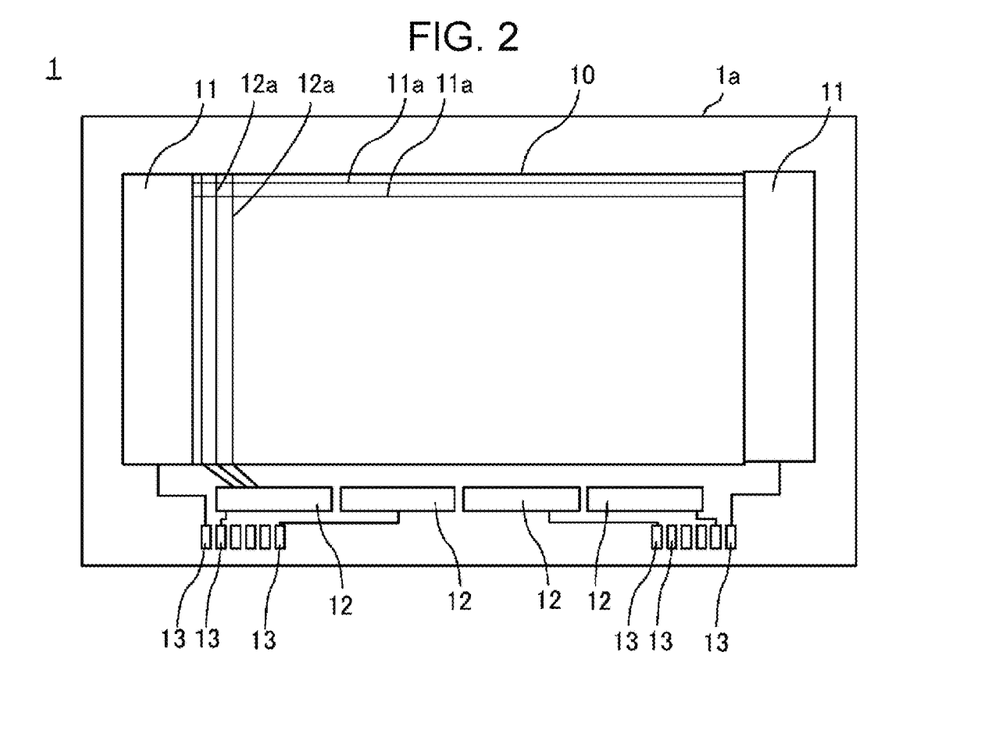
FIG. 2 schematically illustrates a configuration of a display panel.

FIG. 2 schematically illustrates the configuration of the display panel 1. The display panel 1 displays images. For example, the display panel 1 may be a liquid-crystal display panel, an organic electroluminescent (EL) panel or a micro-light-emitting-diode (LED) panel. Referring to FIG. 2, the display panel 1 includes the display 10, the gate driving circuit 11 and the source driving circuit 12. The display panel 1 includes a substrate 1a that includes multiple gate lines 11a, multiple source lines 12a and multiple terminals 13 formed thereon. The gate lines 11a intersect the source lines 12a in a plan view. The display 10 is a region of the substrate 1a that has pixels 10a (see FIG. 3) formed thereon and displays images.

The gate driving circuit 11 successively supplies the gate lines 11a with a gate signal G1 from the level shifter circuit 3. The gate driving circuit 11 is a gate driver monolithic (GDM) circuit that is monolithically formed on the substrate 1a.

The source driving circuit 12 is supplied with an image signal A1 (digital signal) from the timing control circuit 2. The source driving circuit 12 is supplied from the power control circuit 4 with a positive voltage Vp, a negative voltage Vn and a reset signal R1. Using the positive voltage Vp and the negative voltage Vn, the source driving circuit 12 generates a source signal in response to the image signal A1 (digital signal). The source driving circuit 12 supplies the source signal to the source lines 12a. The source driving circuit 12 is an integrated circuit mounted on the substrate 1a.

The terminals 13 are connected to a flexible printed circuit board (not illustrated). The terminals 13 are connected to the timing control circuit 2, the level shifter circuit 3 and the power control circuit 4 via the flexible printed circuit board. The terminals 13 are also connected to the gate driving circuit 11, the source driving circuit 12 and a common electrode wiring (not illustrated).

Figure 3:
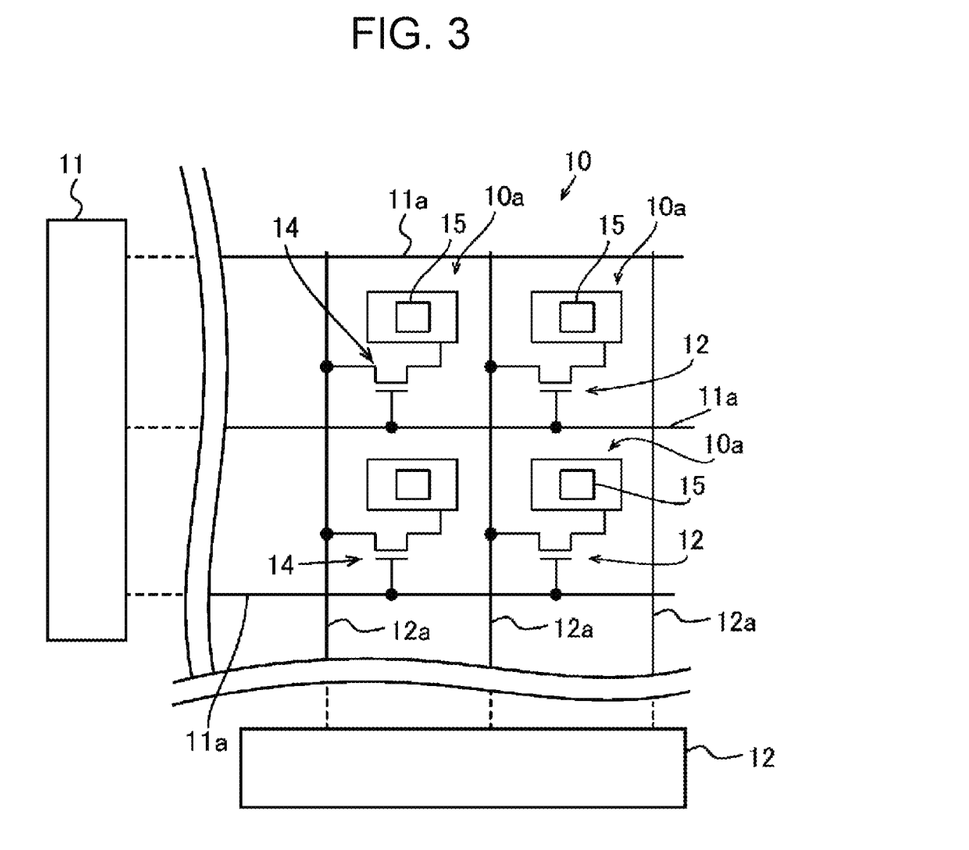
FIG. 3 schematically illustrates a configuration of pixels in the display panel.

FIG. 3 schematically illustrates the configuration of the pixels 10a on the display panel 1. Referring to FIG. 3, the pixels 10a are formed in a region delineated by the gate lines 11a and the source lines 12a. The pixel 10a includes a thin-film transistor 14 and a pixel electrode 15. The gate line 11a is connected to the gate electrode of the thin-film transistor 14. The source line 12a is connected to the source electrode of the thin-film transistor 14. The pixel electrode 15 is connected to the drain electrode of the thin-film transistor 14. When the gate electrode of the thin-film transistor 14 is supplied with a gate signal from the gate line 11a, the pixel electrode 15 is supplied with a source signal and is charged (thus with an image written on the pixel electrode 15).

Configuration of Timing Control Circuit

Referring to FIG. 1, the timing control circuit 2 receives the control signal D1 and the image signal A1 from the host controller 102. The timing control circuit 2 supplies the display panel 1 with the image signal A1 and the level shifter circuit 3 with a timing signal C1. For example, the timing control circuit 2 may be an integrated circuit.

Figure 4:
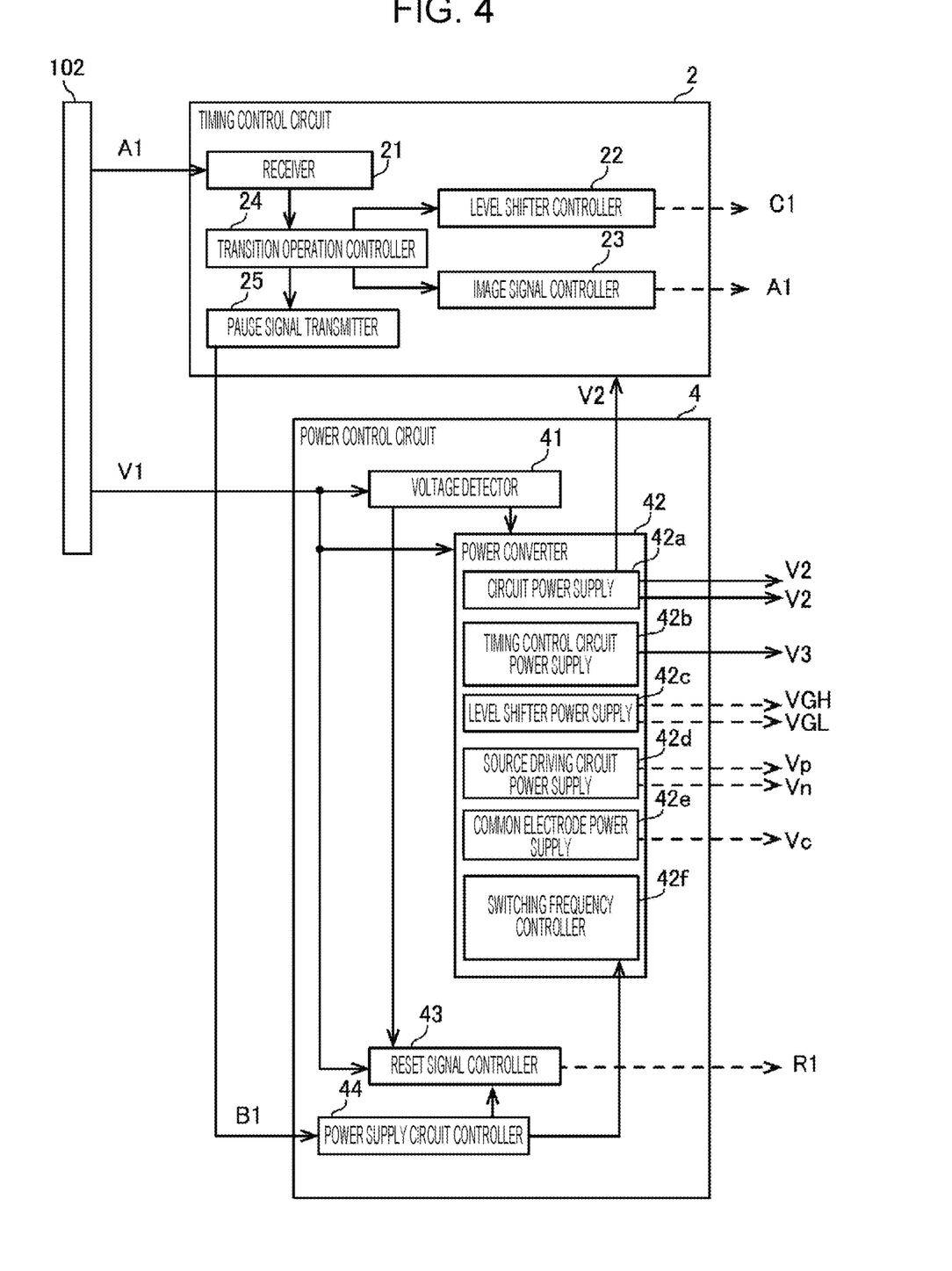
FIG. 4 is a functional block diagram of a timing control circuit and a power control circuit.

FIG. 4 is the functional block diagram of the timing control circuit 2 and the power control circuit 4. Referring to FIG. 4, the timing control circuit 2 includes a receiver 21, a level shifter controller 22, an image signal controller 23, a transition operation controller 24 and a pause signal transmitter 25. The receiver 21 receives the image signal A1 and the control signal D1 from the host controller 102. The level shifter controller 22 transmits the timing signal C1 to the level shifter circuit 3 in response to the image signal A1. The timing signal C1 includes a synchronization signal (such as a vertical synchronization signal) and a clock signal. The image signal controller 23 transmits the image signal A1 to the source driving circuit 12 in the display panel 1.

When the receiver 21 receives the control signal D1 including a signal used to transition from the display mode to the pause mode, the transition operation controller 24 causes the level shifter controller 22 and the image signal controller 23 to stop operating. The supply of the timing signal C1 from the level shifter controller 22 is thus stopped. Stopping the supply of the timing signal C1 causes the gate driving circuit 11 to stop outputting the gate signal. The image signal controller 23 stops supplying the image signal A1. The source driving circuit 12 thus stops outputting the source signal. The transition operation controller 24 transmits to the pause signal transmitter 25 a signal that commands the pause signal transmitter 25 to transmit the pause signal B1.

When the receiver 21 receives the control signal D1 including a signal used to transition from the pause mode to the display mode, the transition operation controller 24 causes the level shifter controller 22 and the image signal controller 23 to start operating (resume operation). The level shifter controller 22 thus starts supplying the timing signal C1. The start of supplying the timing signal C1 causes the gate driving circuit 11 to start outputting the gate signal. The image signal controller 23 also starts supplying the image signal A1. The source driving circuit 12 starts outputting the source signal. The transition operation controller 24 transmits to the pause signal transmitter 25 a signal that commands the pause signal transmitter 25 to stop transmitting the pause signal B1.

In response to the command from the transition operation controller 24, the pause signal transmitter 25 transmits the pause signal B1 to the power control circuit 4. For example, the pause signal transmitter 25 transmits the pause signal B1 by transitioning to a high level the level of a voltage applied to a signal line connected to the power control circuit 4. In response to the command from the transition operation controller 24, the pause signal transmitter 25 stops transmitting the pause signal B1 by transitioning to a low level the level of the voltage applied to the signal line connected to the power control circuit 4.

Configuration of Level Shifter Circuit

The level shifter circuit 3 generates the gate signal G1 responsive to the timing signal C1 from the timing control circuit 2 in the display mode using voltages VGH and VGL supplied from the power control circuit 4. Via the gate driving circuit 11, the level shifter circuit 3 successively transmits to the gate lines 11a the pulse-shaped gate signal G1 at the voltage VGH. The level shifter circuit 3 also supplies the voltage VGL to gate lines 11a excluding the gate lines 11a that are currently supplied with the gate signal G1.

Configuration of Power Control Circuit

The power control circuit 4 controls a power-on state and a power-off state of each of the display panel 1, the timing control circuit 2 and the level shifter circuit 3. Referring to FIG. 4, the power control circuit 4 includes a voltage detector 41, a power converter 42, a reset signal controller 43 and a power supply circuit controller 44.

The voltage detector 41 detects a voltage V1 (at a high voltage level) supplied by the host controller 102. When the host controller 102 stops supplying the voltage V1 (with the voltage level transitioned to a low level), the voltage detector 41 causes the reset signal controller 43 to stop outputting the reset signal R1. When the host controller 102 stops supplying the voltage V1, the voltage detector 41 also causes the power converter 42 to stop outputting voltages. For example, the supply of the voltage V1 from the host controller 102 is stopped when the display system 100 is powered off and the host controller 102 is thus powered off.

The power converter 42 converts the input voltage V1 into voltages V2, V3, VGH, VGL, Vp, Vn and Vc and supplies power at converted voltages to the display panel 1, the level shifter circuit 3, the source driving circuit 12 and the timing control circuit 2. The power converter 42 includes a switching element. The power converter 42 generates a voltage at a predetermined voltage value by turning on or off the voltage input at a switching frequency. For example, the power converter 42 is a pulse-width modulation switching regulator.

The power converter 42 includes a circuit power supply 42a, a timing control circuit power supply 42b, a level shifter power supply 42c, a source driving circuit power supply 42d, a common electrode power supply 42e and a switching frequency controller 42f. The switching frequency of the power converter 42 is variable and may be determined in response to a command from the switching frequency controller 42f. The switching frequency controller 42f sets the switching frequency of the power converter 42 to f1 in the display mode before the power supply circuit controller 44 receives the pause signal B1 from the timing control circuit 2. The switching frequency controller 42f also sets the switching frequency to f2 lower than f1 in the pause mode after the power supply circuit controller 44 receives the pause signal B1 from the timing control circuit 2. In other words, the switching frequency controller 42f transitions the switching frequency from f1 to f2 in response to the reception of the pause signal B1. The switching frequency controller 42f transitions the switching frequency from f2 to f1 when the pause signal B1 is received no longer.

Figure 5:
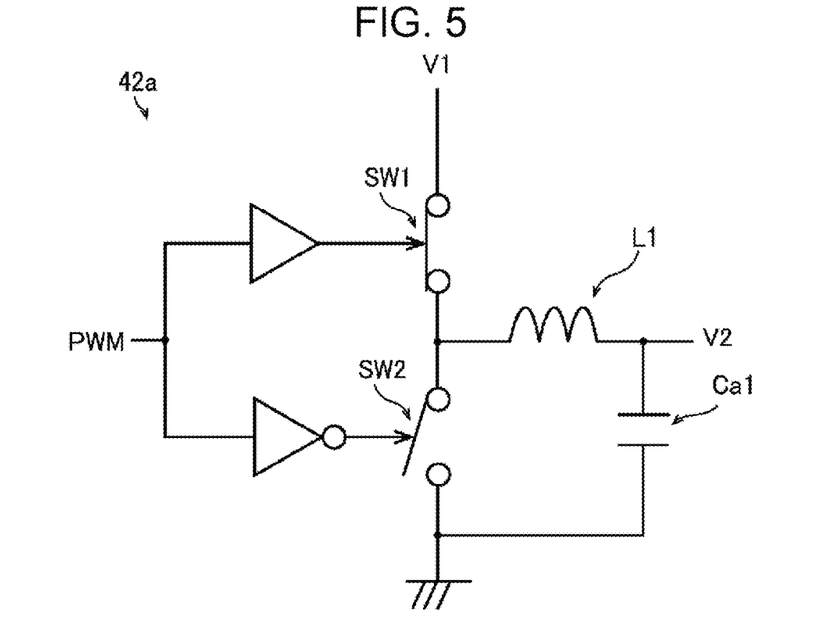
FIG. 5 is a circuit diagram schematically illustrating a circuit power supply.

FIG. 5 is a circuit diagram schematically illustrating the circuit power supply 42a. The circuit power supply 42a converts the voltage V1 output from the host controller 102 into a voltage V2 used to operate the display panel 1, the timing control circuit 2 and the level shifter circuit 3. The circuit power supply 42a thus outputs the voltage V2 to the display panel 1, the timing control circuit 2 and the level shifter circuit 3. For example, the voltage V1 is 3.3 V and the voltage V2 is 1.8 V. The circuit power supply 42a includes switching elements SW1 and SW2, an inductor L1 connected to the output sides of the switching elements SW1 and SW2, and a capacitor Ca1. The circuit power supply 42a generates a pulse-width modulation (PWM) signal at a switching frequency set by the switching frequency controller 42f and performs a switching operation using the switching elements SW1 and SW2 in response to the PWM signal. The voltage V1 is switched and then smoothed by the inductor L1 and the capacitor Ca1 into the voltage V2.

The timing control circuit power supply 42b converts the voltage V1 output from the host controller 102 into a voltage V3 used to operate the timing control circuit 2. The timing control circuit power supply 42b outputs the voltage V3 to the timing control circuit 2. The voltage V3 is different in voltage value from the voltage V2. The circuit configuration of the timing control circuit power supply 42b is identical to the circuit power supply 42a and the discussion thereof is omitted herein.

Figure 6:
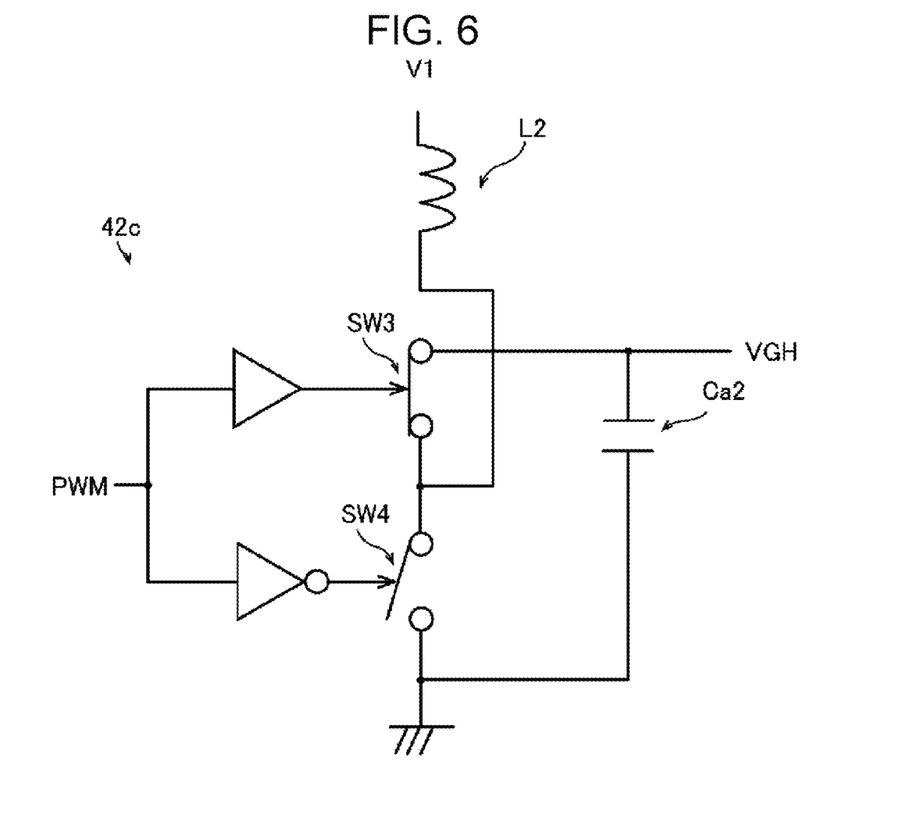
FIG. 6 is a circuit diagram schematically illustrating a level shifter power supply.

FIG. 6 is a circuit diagram schematically illustrating the level shifter power supply 42c. The level shifter power supply 42c converts the voltage V1 output from the host controller 102 into the voltages VGH and VGL that the level shifter circuit 3 uses to generate the gate signal G1. The level shifter power supply 42c outputs the voltages VGH and VGL to the level shifter circuit 3. The level shifter power supply 42c includes switching elements SW3 and SW4, an inductor L2 connected to the input sides of the switching elements SW3 and SW4, and a capacitor Ca2. The level shifter power supply 42c generates the PWM signal at the switching frequency set by the switching frequency controller 42f and performs the switching operation using the switching elements SW3 and SW4 in response to the PWM signal. With the voltage V1 supplied to the inductor L2, energy is accumulated in the inductor L1 for a period of time while the switching element SW3 is off and the switching element SW4 is on. When the switching element SW3 is turned on and the switching element SW4 is turned off, a voltage higher in voltage value than the voltage V1 is output and then smoothed into the voltage VGH. A portion of the level shifter power supply 42c generating the voltage VGL is not illustrated and a voltage having a polarity reversal to the voltage VGH is generated as the voltage VGL.

The source driving circuit power supply 42d converts the voltage V1 output from the host controller 102 into the positive voltage Vp and the negative voltage Vn that the source driving circuit 12 uses to generate the source signal. The source driving circuit power supply 42d outputs the positive voltage Vp and the negative voltage Vn to the source driving circuit 12. The source driving circuit power supply 42d is identical in circuit configuration to the level shifter power supply 42c is identical to the level shifter power supply 42c and the discussion thereof is omitted herein. The common electrode power supply 42e converts the voltage V1 output from the host controller 102 into a voltage Vc that is supplied to the common electrode of the display panel 1. The common electrode power supply 42e outputs the voltage Vc to the display panel 1. The circuit configuration of the common electrode power supply 42e is identical to the level shifter power supply 42c and the discussion thereof is omitted herein.

The reset signal controller 43 outputs the reset signal R1 in response to a command from the voltage detector 41. When the reset signal R1 transitions to a low voltage level (off) from a high voltage level, the level shifter circuit 3 and the source driving circuit 12 stop operating. Specifically, the level shifter circuit 3 (the gate driving circuit 11) outputs the gate signal with the reset signal R1 at a high voltage level while stopping outputting the gate signal with the reset signal R1 at a low voltage level. The source driving circuit 12 outputs the source signal with the reset signal R1 at a high voltage level and while stopping outputting the source signal with the reset signal R1 at a low voltage level.

With the pause signal B1 received from the timing control circuit 2, the power supply circuit controller 44 causes the switching frequency controller 42f to transition the switching frequency from f1 to f2. With the pause signal B1 not received from the timing control circuit 2, the power supply circuit controller 44 causes the switching frequency controller 42f to transition the switching frequency from f2 to f1.

With the pause signal B1 received from the timing control circuit 2, the power supply circuit controller 44 causes the level shifter power supply 42c, the source driving circuit power supply 42d and the common electrode power supply 42e to stop supplying power while allowing the circuit power supply 42a and the timing control circuit power supply 42b in the power converter 42 to continuously supply power. In this way, the level shifter circuit 3, not supplied with power from the level shifter power supply 42c, stops the operation thereof (thus stopping outputting the gate signal). The supply of power to the common electrode in the display panel 1 is also stopped. The source driving circuit 12, not supplied with power by the level shifter power supply 42c, stops the operation thereof (thus stopping outputting the source signal). The supply of power to the timing control circuit 2 is maintained. Time to start up the timing control circuit 2 may be saved from when the control signal D1 including the signal used to transition from the pause mode to the display mode is received until when the display panel 1 displays images. As a result, a shorter period of time may result from when the control signal D1 including the signal used to transition from the pause mode to the display mode is received until when the display panel 1 displays images.

Operation of Display System

Operation of the display system 100 of the first embodiment is described below.

Figure 7:
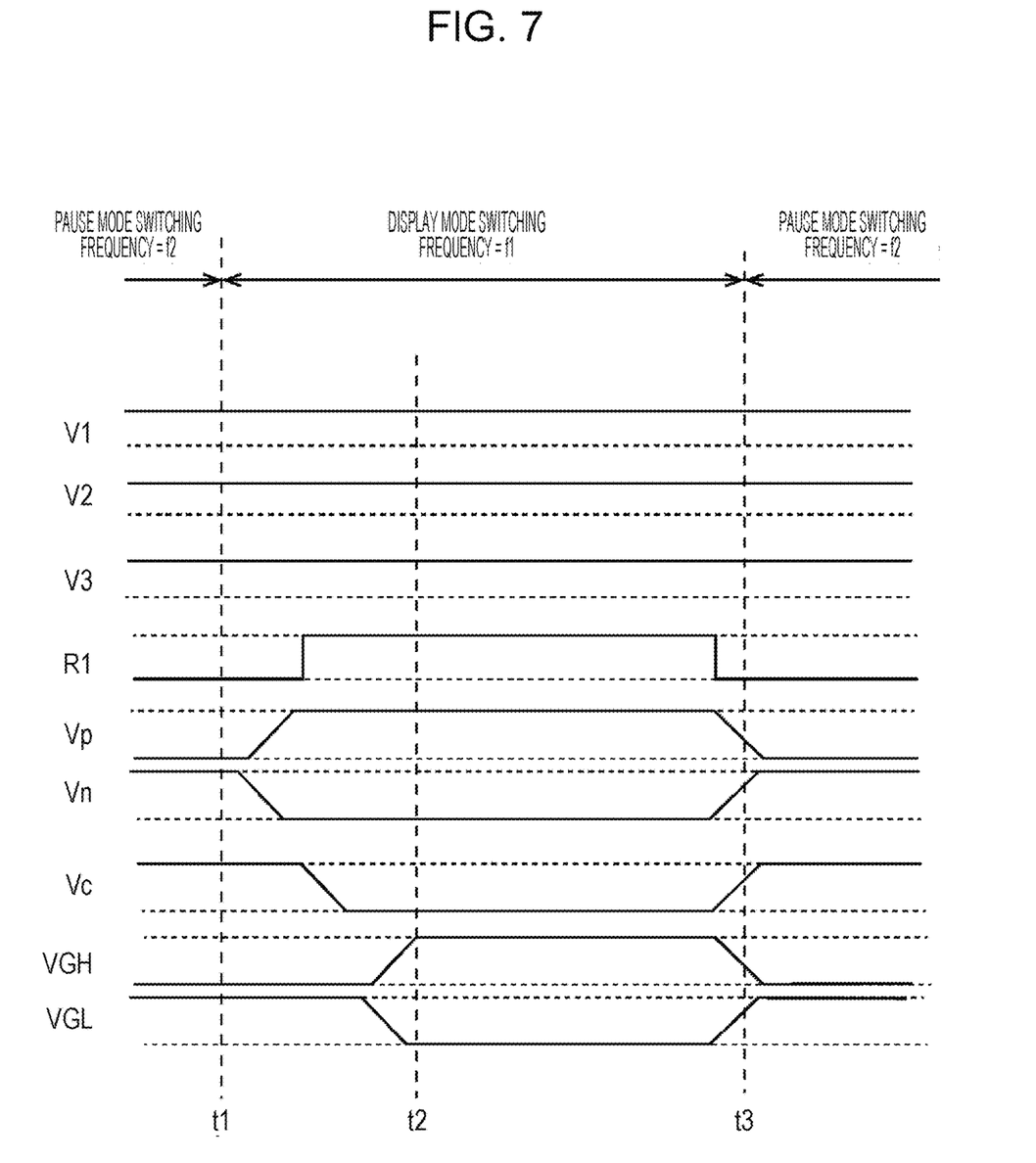
FIG. 7 is a timing diagram illustrating an operation of the display system according to the first embodiment.

As illustrated in FIG. 7, the supply of the voltage V1 from the host controller 102 to the power control circuit 4 is performed in both the pause mode and the display mode in the first embodiment. In the pause mode prior to time t1, the power control circuit 4 converts the input voltage V1 into the voltages V2 and V3 by performing a switching operation at the switching frequency of f2. In the pause mode, the voltages V2 and V3 are output. In the pause mode, the outputting of the voltages Vp, Vn, Vc, VGH and VGL and the reset signal R1 is suspended.

When the pause mode transitions to the display mode at time t1, the host controller 102 transmits to the timing control circuit 2 the control signal D1 including a signal used to transition from the pause mode to the display mode. The timing control circuit 2 starts supplying the timing signal C1 to the level shifter circuit 3 and supplying the image signal A1 to the source driving circuit 12.

The timing control circuit 2 stops supplying the pause signal B1 to the power control circuit 4 at time t1. Since the power control circuit 4 supplied with the voltage V1 continues to output the voltages V2 and V3 in the pause mode, the voltages V2 and V3 remain to be output at time t1. The power control circuit 4 supplied with the voltage V1 starts outputting the voltages Vp, Vn, Vc, VGH and VGL and the reset signal R1 after time t1 and the display panel 1 starts the displaying operation at time t2. According to the first embodiment, the display panel 1 may start the displaying operation within a shorter period of time from time t1 at which the control signal D1 including the signal used to transition from the pause mode to the display mode is received.

At time t1, the switching frequency of power conversion of the power control circuit 4 is changed from f2 to f1. Since the power conversion is performed at the switching frequency higher than in the pause mode, fast response may be achieved even when load is varied during the displaying operation. A higher switching frequency may reduce the effects of rippling on the displaying.

When the display mode transitions to from the display mode the pause mode at time t3, the host controller 102 transmits to the timing control circuit 2 the control signal D1 including the signal used to transition from the display mode to the pause mode. The switching frequency of power conversion of the power control circuit 4 is changed from f1 to f2. The power control circuit 4 may thus perform power conversion at a lower switching frequency in the pause mode. Power consumption may thus be reduced during a control operation in the pause mode. With the power conversion performed at the lower switching frequency, the creation of noise may be restricted in the pause mode. Also, with the power conversion performed at the lower switching frequency, power conversion efficiency in the power conversion in the pause mode may be increased.

Second Embodiment

The configuration of a display system 200 of a second embodiment is described with reference to FIG. 8. In the first embodiment, the pause signal B1 is transmitted by transitioning a single signal line to a high voltage level or a low voltage level. In the second embodiment, the pause signal B1 is transmitted in response to a command. The same elements identical to those in the first embodiment are designated with the same reference numerals and the discussion thereof is omitted herein.

Figure 8:
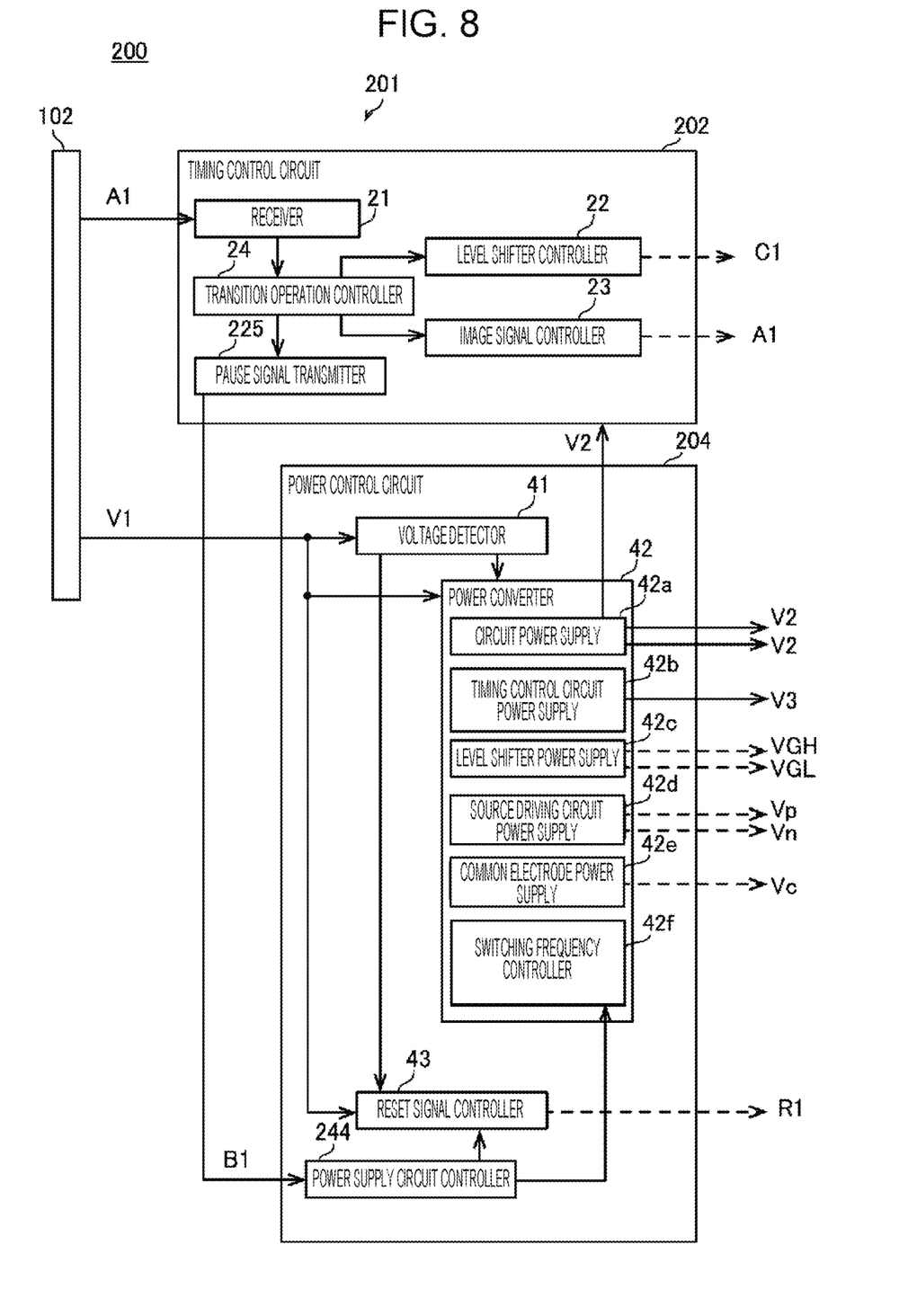
FIG. 8 is a block diagram illustrating a configuration of a display system according to a second embodiment.

Referring to FIG. 8, the display system 200 includes a display apparatus 201. The display apparatus 201 includes a timing control circuit 202 and a power control circuit 204. In the second embodiment, the timing control circuit 202 is connected to the power control circuit 204 via an I2C bus and performs serial communication with the power control circuit 204. A pause signal transmitter 225 in the timing control circuit 202 transmits the pause signal B1 as a command in the serial communication. In response to the reception of the command, a power supply circuit controller 244 in the power control circuit 204 transitions the switching frequency from f1 to f2. Also, in response to the reception of the command, the power supply circuit controller 244 in the power control circuit 204 causes the level shifter power supply 42c, the source driving circuit power supply 42d and the common electrode power supply 42e to stop supplying power while keeping the circuit power supply 42a and the timing control circuit power supply 42b in the power converter 42 supplying power. The rest of the configuration and effects of the second embodiment remain unchanged from the configuration and effects of the first embodiment.

Third Embodiment

Figure 9:
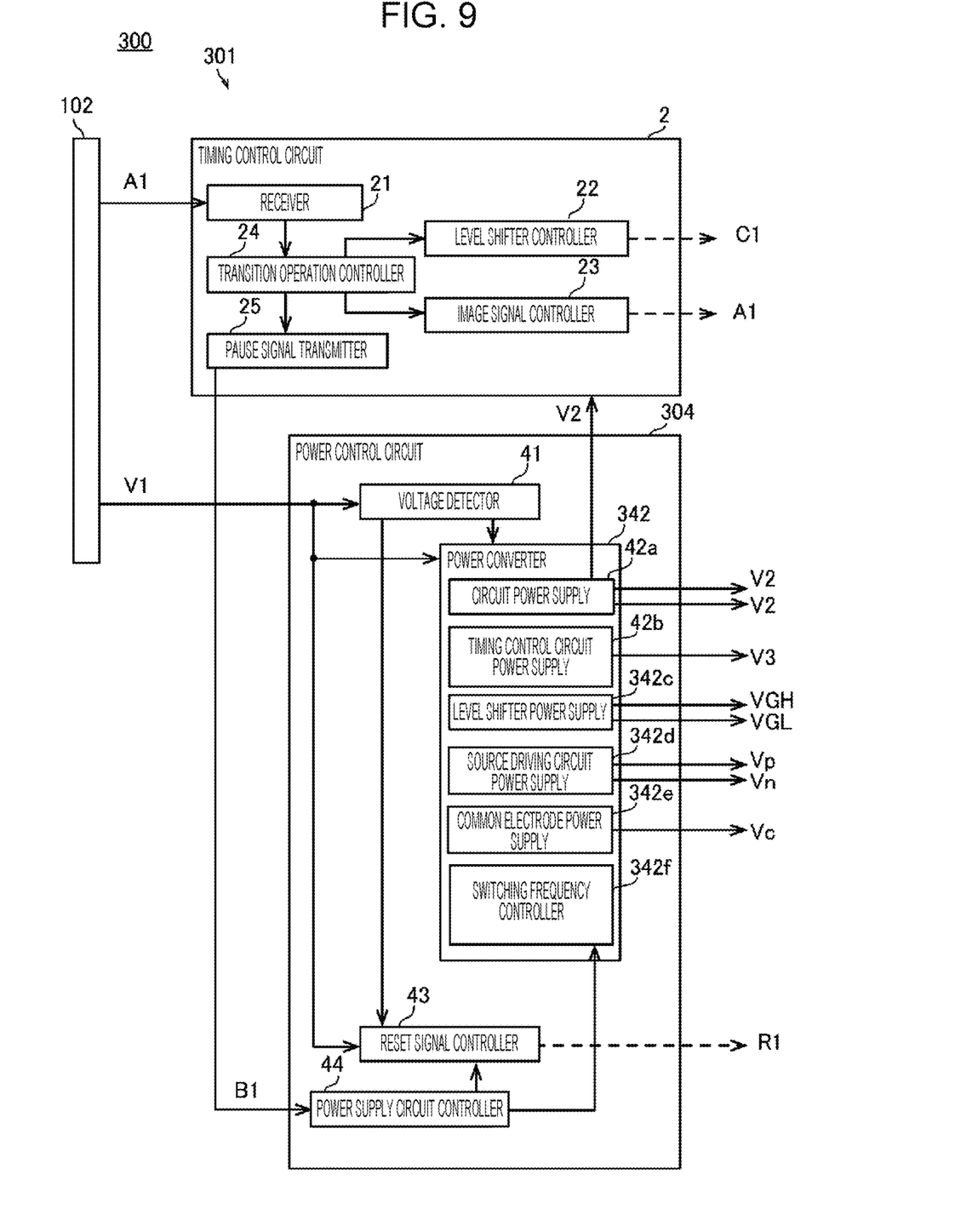
FIG. 9 is a block diagram illustrating a configuration of a display system according to a third embodiment.

Referring to FIG. 9, the configuration of a display system 300 of a third embodiment is described below. According to the third embodiment, in response to the reception of the pause signal B1, the power control circuit 204 continues to supplying power not only to the timing control circuit 202 but also to the display panel 1, the level shifter circuit 3 and the source driving circuit 12. Elements of the third embodiment identical to the elements of the first embodiment are designated with the same reference numerals and the discussion thereof is omitted herein.

As illustrated in FIG. 9, the display system 300 includes a display apparatus 301. The display apparatus 301 includes a power control circuit 304. The power control circuit 304 includes a power converter 342 and a power supply circuit controller 344. The power converter 342 of the third embodiment includes a level shifter power supply 342c, a source driving circuit power supply 342d, a common electrode power supply 342e and a switching frequency controller 342f.

The switching frequency controller 342f transitions the switching frequency from f1 to f2 when the pause signal B1 is received from the timing control circuit 2. The level shifter power supply 342c, the source driving circuit power supply 342d and the common electrode power supply 342e perform power conversion at the switching frequency of f2. The level shifter power supply 342c still outputs the voltages VGH and VGL in the pause mode. The source driving circuit power supply 342d still outputs the voltages Vp and Vn in the pause mode. The common electrode power supply 342e still outputs the voltage Vc in the pause mode. Since the timing control circuit 2 does not output the timing signal C1 and the image signal A1 in the pause mode, the display panel 1 pauses (not displaying images) even when the power converter 342 outputs the voltages VGH and VGL. The rest of the configuration and effects of the third embodiment is identical to the configuration and effects of the first embodiment.

Modifications

The embodiments of the disclosure have been described for exemplary purposes only. The disclosure is not limited to the embodiments and the embodiments may be modified without departing from the scope of the disclosure. Modifications of the embodiments are described below.

(1) According to the first through third embodiments, the host controller supplies the voltage V1 to the power control circuit. The disclosure is not limited to this method. A power supply circuit other than the host controller may supply the voltage V1 to the power control circuit.

(2) According to the first through third embodiments, the switching frequency of all power conversion operations of the power converter is set to f2 in the pause mode. The disclosure is not limited to this method. For example, in the pause mode, the switching frequency of a subset of the power conversion operations performed by the power converter (for example, the switching frequency at the power conversion of the voltage V1 to the voltage V2) is set to f2 and the switching frequency of the other power conversion operations may be set to f1.

(3) According to the first through third embodiments, the display panel includes the gate driver monolithic (GDM) circuit. The disclosure is not limited to this configuration. For example, an integrated circuit (gate driver) including a level shifter circuit may be mounted on the substrate.

(4) According to the first through third embodiments, the display driving circuit includes the level shifter circuit. The disclosure is not limited to this configuration. The display driving circuit may not include the level shifter circuit but may include a driving circuit in which the gate signal is successively supplied to multiple gate lines.

The configurations described above may also be specified as described below.

According to a first configuration, there is a provided a display apparatus including: a display panel; a display driving circuit that supplies the display panel with a driving signal; a timing control circuit that supplies the display panel with an image signal and the display driving circuit with a timing signal; and a power converter circuit that converts input power at an input voltage into power at an output voltage and supplies the power at the output voltage to at least one of the display panel, the display driving circuit and the timing control circuit, wherein in response to reception of a control signal from a host controller with the control signal used to transition the display panel from a display mode causing the display panel to perform displaying to a pause mode causing the display panel to stop displaying, the timing control circuit transmits a pause signal to the power converter circuit, and wherein the power converter circuit converts the input voltage to the output voltage at a first switching frequency in the display mode before receiving the pause signal and converts the input voltage to the output voltage at a second switching frequency lower than the first switching frequency in the pause mode after receiving the pause signal from the timing control circuit.

Power consumed in power conversion may be lower as the switching frequency is lower. According to the first configuration, the power converter circuit may perform the power conversion at a lower switching frequency for a duration of time throughout which a control operation is performed in the pause mode. Power consumption may thus be reduced for the period of the control operation in the pause mode. The power conversion performed at the lower switching frequency may control the creation of noise in the pause mode. The power conversion performed at the lower switching frequency may improve the efficiency of the power conversion in the pause mode. Since the input voltage is converted at the switching frequency higher than in the pause mode for the period throughout which the display panel performs a displaying operation, fast response may be achieved even when load varies in the displaying operation. The higher switching frequency may reduce the effects of ripples in the displaying operation.

In the first configuration, the power converter circuit may be configured such that the power converter circuit supplies, in the display mode, power to the timing control circuit, the display panel and the display driving circuit, and in response to the reception of the pause signal in the display mode, stops supplying at least part of the power to be supplied to the display panel and the display driving circuit while keeping supplying power to the timing control circuit, and converts in the pause mode the input voltage to the output voltage of the power to be supplied to the timing control circuit at the second switching frequency (second configuration).

Since the timing control circuit is supplied with power even for the period of the control operation in the pause mode in the second configuration, the timing control circuit is free from a startup operation in the transition of the pause mode to the display mode. For this reason, time to be used to transition from the pause mode to the display mode may be reduced.

In the second configuration, the power converter circuit may be configured such that in response to the reception of the pause signal, the power converter circuit stops supplying power to the display panel and the display driving circuit while keeping supplying power to the timing control circuit (third configuration).

According to the third configuration, power consumption may be even more reduced since the supply of power to the display panel and the display driving circuit is suspended for the period throughout which the control operation is performed in the pause mode.

According to a fourth configuration, there is provided a display system including: a display apparatus including a display panel; and a host controller that transmits to the display apparatus a control signal that transitions the display panel from a display mode causing the display panel to perform displaying to a pause mode causing the display panel to stop displaying, wherein the display apparatus includes: a display driving circuit that supplies the display panel with a driving signal; a timing control circuit that supplies the display panel with an image signal and the display driving circuit with a timing signal; and a power converter circuit that converts input power at an input voltage into power at an output voltage and supplies the power at the output voltage to at least one of the display panel, the display driving circuit and the timing control circuit, wherein in response to reception of the control signal from the host controller with the control signal used to transition the display panel from the display mode causing the display panel to perform displaying to the pause mode causing the display panel to stop displaying, the timing control circuit transmits a pause signal to the power converter circuit, and wherein the power converter circuit converts the input voltage to the output voltage at a first switching frequency in the display mode before receiving the pause signal and converts the input voltage to the output voltage at a second switching frequency lower than the first switching frequency in the pause mode after receiving the pause signal from the timing control circuit (fourth configuration).

According to the fourth configuration, the display system thus provided may reduce the power consumption for the period throughout which the control operation is performed in the pause mode.

The present disclosure contains subject matter related to that disclosed in Japanese Priority Patent Application JP 2023-119441 filed in the Japan Patent Office on Jul. 21, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
a display panel;
a display driving circuit that supplies the display panel with a driving signal;
a timing control circuit that supplies the display panel with an image signal and supplies the display driving circuit with a timing signal; and
a power converter circuit that converts input power at an input voltage into power at an output voltage, and that supplies the power at the output voltage to at least one of the display panel, the display driving circuit, and the timing control circuit,
wherein, in response to a reception of a control signal from a host controller, wherein the control signal triggers a transition of the display panel from a display mode causing the display panel to perform displaying to a pause mode causing the display panel to stop displaying, the timing control circuit transmits a pause signal to the power converter circuit, and
wherein the power converter circuit:
converts the input voltage to the output voltage at a first switching frequency in the display mode before receiving the pause signal, and
converts the input voltage to the output voltage that has a voltage value that is the same as a first voltage value output to the timing control circuit in the display mode at a second switching frequency lower than the first switching frequency in the pause mode after receiving the pause signal from the timing control circuit.

2. The display apparatus according to claim 1, wherein the power converter circuit:
supplies, in the display mode, power to the timing control circuit, the display panel, and the display driving circuit,
in response to the reception of the pause signal in the display mode, stops supplying at least part of the power to be supplied to the display panel and the display driving circuit while keeping supplying power to the timing control circuit, and
converts, in the pause mode, the input voltage to the output voltage of the power to be supplied to the timing control circuit at the second switching frequency.

3. The display apparatus according to claim 2, wherein, in response to the reception of the pause signal, the power converter circuit stops supplying the power to be supplied to the display panel and the display driving circuit while keeping supplying the power to the timing control circuit.

4. A display system comprising:

a display apparatus including a display panel; and a host controller that transmits, to the display apparatus, a control signal that triggers a transition of the display panel from a display mode causing the display panel to perform displaying to a pause mode causing the display panel to stop displaying, wherein the display apparatus further includes:
- a display driving circuit that supplies the display panel with a driving signal;
- a timing control circuit that supplies the display panel with an image signal and supplies the display driving circuit with a timing signal; and
- a power converter circuit that converts input power at an input voltage into power at an output voltage, and that supplies the power at the output voltage to at least one of the display panel, the display driving circuit, and the timing control circuit, wherein, in response to a reception of the control signal from the host controller, wherein the control signal triggers the transition of the display panel from the display mode causing the display panel to perform displaying to the pause mode causing the display panel to stop displaying, the timing control circuit transmits a pause signal to the power converter circuit, and wherein the power converter circuit:
- converts the input voltage to the output voltage at a first switching frequency in the display mode before receiving the pause signal, and
- converts the input voltage to the output voltage that has a voltage value that is the same as a first voltage value output to the timing control circuit in the display mode at a second switching frequency lower than the first switching frequency in the pause mode after receiving the pause signal from the timing control circuit.

* * * * *